United States Patent Office 3,095,394
Patented June 25, 1963

3,095,394
POLYOLEFIN OXIDES STABILIZED WITH 1,1-DIPHENYL-2-PICRYLHYDRAZINE AND 1,1-DI-PHENYL-2-PICRYLHYDRAZYL
Charles W. McGary, Jr., Charleston, W. Va., assignor to Union Carbide Corporation, a corporation of New York
No Drawing. Filed May 3, 1960, Ser. No. 26,413
7 Claims. (Cl. 260—29.2)

This invention relates to olefin oxide polymers. In one aspect, this invention relates to the stabilization of olefin oxide polymers against appreciable molecular degradation during storage, in transit, during processing, and the like.

The tendency for olefin oxide polymers to degrade has presented a serious problem in those fields of application where molecular weight stability is both a necessary and desirable feature. It has been noted that solid olefin oxide polymers can undergo a substantial loss in average molecular weight when stored in solid form at room temperature for several days, when subjected to elevated temperatures for short periods of time, or when stored in the form of aqueous or organic solutions. The effect of the reduced viscosity loss or molecular weight degradation is more prevalent as the molecular weight of the polymer increases. The particular use to which the polymer is ultimately put, will largely be determinative of the permissible variation of the molecular weight range. For instance, a customer who orders a solid olefin oxide polymer of a definite viscosity range for a particular field of application desires a product of relative stability or enhanced stability especially during storage or in transit. However, unless the olefin oxide polymer is adequately protected against substantial molecular weight degradation, the loss in molecular weight can be so serious as to completely change the physical character of the polymer from a tough resin to a brittle wax, and as a consequence, the resulting degraded polymer has limited applicability or no applicability for the original intended use.

The present invention contemplates the stabilization of olefin oxide polymers by incorporating therein a stabilizing amount of certain organic compounds hereinafter defined. The aforesaid olefin oxide polymers exhibit improved stability against molecular weight degradation during storage, transit, or processing over extended periods of time, e.g., several weeks, as compared with corresponding olefin oxide polymers lacking the above-mentioned stabilizers.

Accordingly, one or more of the following objects will be achieved by the practice of the instant invention. It is an object of this invention to improve the stability of olefin oxide polymers against molecular degradation. It is another object of this invention to provide a novel composition comprising a resinous olefin oxide polymer and a stabilizing amount of a stabilizer hereinafter described. A further object of the present invention is to improve the stability of poly(ethylene oxide) which has a reduced viscosity value in the range of from about 1.0 to 75, and higher, against molecular degradation. Another object is to improve the stability of copolymers comprised of at least 50 weight percent of ethylene oxide in copolymerized form with up to 50 weight percent of lower olefin oxide, such as, propylene oxide, butylene oxide, and the like. A still further object is to provide a novel process for stabilizing olefin oxide polymers against molecular degradation. Another object of the present invention is to provide a novel process for stabilizing solid copolymers comprised of at least 50 weight percent of ethylene oxide in copolymerized form with up to 50 weight percent of lower olefin oxides, such as, propylene oxide, butylene oxide, and the like, against molecular degradation. Another object of the present invention is to render granular poly(ethylene oxide) which has a reduced viscosity value of at least about 1.0 relatively stable against molecular weight degradation. These and other objects will readily become apparent to those skilled in the art in the light of the teachings herein set forth.

By the term "reduced viscosity," as employed throughout the specification and appended claims, is meant a value obtained by dividing the specific viscosity by the concentration of the polymer in solution, the concentration being measured in grams of polymer per 100 milliliters of solvent at a given temperature. The term is regarded as a measure of molecular weight. The specific viscosity is obtained by dividing the difference between the viscosity of the solution and the viscosity of the solvent by the viscosity of the solvent. Unless stated otherwise, the reduced viscosities herein referred to are measured at a concentration of 0.2 gram of polymer in 100 milliliters of acetonitrile at 30° C. Also, unless otherwise stated herein, the reduced viscosity of olefin oxide polymer, particularly homopolymers of ethylene oxide and copolymers thereof, is a value in the range of at least 1.0 and upwards to 75, and higher.

The term "bulk viscosity," as employed herein, refers to the viscosity of the stated concentration of polymer in a solvent, as measured on a model RVF Brookfield viscometer using a No. 2 spindle operated at 6 revolutions per minute, unless otherwise stated. The viscosity is measured at ambient room temperatures, that is, about 24° C.

In accordance with the present invention it has been found that the molecular weight stability of olefin oxide polymers, preferably granular poly(ethylene oxide) can be considerably enhanced or improved by incorporating therein a stabilizing amount of a compound which is a member selected from the group consisting of 1,1-diphenyl-2-picrylhydrazine and 1,1-diphenyl-2-picrylhydrazyl.

In practice, it has been found desirable to employ the stabilizer of the instant invention either as 1,1-diphenyl-2-picrylhydrazine or as the 1,1-diphenyl-2-picrylhydrazyl free radical. Inasmuch as the free radical has a relatively long life, and as such can exist independently of its corresponding hydrazine, it is possible to stabilize the olefin oxide polymer by addition thereto of an inhibiting amount of the stabilizer in its free radical form.

While not wishing to be bound by any particular mechanisms regarding the degradation of olefin oxide polymers, it has been established that molecular degradation can be achieved by mechanical shearing forces, which presumably cause polymer chain scission. However, this does not explain the gradual viscosity loss, i.e. molecular degradation, under non-shearing conditions. Under the latter conditions, as might be encountered in aqueous or organic solutions, it is believed that the olefin oxide polymers degrade primarily by autoxidation resulting in polymer chain cleavage. It has been noted that this degradation of olefin oxide polymers, and in particular poly(ethylene oxide), is accelerated by the presence of such factors as oxygen, hydrogen peroxide, certain metal ions, ultraviolet light, and others. The effect of said factors on the molecular weight properties of olefin oxide polymers can readily be seen by reference to the following tables wherein resinous poly(ethylene oxide) is illustrative of the polymer employed:

TABLE I

*Effect of Oxidizing Agents on the Viscosity of Aqueous Solution of Poly(Ethylene Oxide)*

| Oxidizing Agent [a] | Viscosity, cps. at 25° C. | |
|---|---|---|
| | Initial [b] | Final [c] |
| Hydrogen Peroxide | 1,770 | 60 |
| Peracetic Acid | 2,630 | 30 |
| Bromine | 1,420 | 120 |
| Potassium permanganate | 1,420 | 40 |

[a] Concentration of oxidizing agent is 0.01 gram per 1.0 gram of poly(ethylene oxide).
[b] Before addition of oxidizing agent.
[c] One day after addition of oxidizing agent.

TABLE II

*Effect of Metallic Ions on the Viscosity of Aqueous Solutions of Poly(Ethylene Oxide)*

| Metal Salt [a] | Percent Viscosity Loss [b] | |
|---|---|---|
| | Control | Metal Salt |
| Cupric chloride | 10.5 | 74 |
| Cuprous chloride [c] | 7.3 | 81 |
| Ferrous sulfate | 0.0 | 96 |
| Ferric chloride | 10.5 | 15.6 |
| Silver nitrate | 10.6 | 64 |

[a] Approximately 0.01 gram salt per gram of poly(ethylene oxide).
[b] Viscosity loss was measured over a period ranging from several hours to two days.
[c] Incompletely soluble.

TABLE III

*Effect of Ultraviolet Light on the Viscosity of Poly(Ethylene Oxide) Solutions*

| Solvent | Percent Viscosity Loss | | | |
|---|---|---|---|---|
| | (a) | (b) | (c) | (d) |
| Water | 4.2 | 6.3 | 42 | 23 |
| Acetonitrile | 2.8 | 5.2 | 85 | 68 |
| Chloroform | | | 55 | 94 | 88 |

[a] Bottles wrapped in tape. Viscosity after 12 days.
[b] Bottles stored in drawer for 12 days.
[c] Exposed to window light for 12 days.
[d] Exposed to sun lamp for 7 hours. The light source was 24 inches from the bottle.

The aforementioned 1,1-diphenyl-2-picrylhydrazine or the 1,1-diphenyl-2-picrylhydrazyl stabilizers employed in the instant invention are particularly effective in stabilizing olefin oxide polymers against molecular degradation. The manner by which the aforesaid stabilizers are incorporated or admixed with the olefin oxide polymer does not appear to be critical and any of several means can be employed to effect such admixture.

When the polymer is to be stored or utilized in the form of an aqueous solution or contained in an inert, normally liquid organic vehicle, it has been found desirable to add the stabilizer to the polymer solvent, prior to, or during the period when said polymer is being dissolved. Inasmuch as some degradation may otherwise occur while the polymer is being dissolved, the greatest stability is obtained by this practice. However, it should be noted that addition of the stabilizer at any stage imparts a stabilizing effect from thence forth. Suitable inert normally liquid organic solvents in which the polymer and stabilizer are soluble include acetic acid, acetonitrile, chloroform, methylene chloride, benzene, chlorobenzene, water, and the like.

When the polymer is to be stored or utilized in the dry state, such as granules or powder, the stabilizer can be effectively dispersed throughout the polymer by means of an inert organic solvent. The solvent chosen should be capable of dissolving the stabilizer but preferably not the polymer. The polymer is first slurried in the solvent containing the stabilizer. Thereafter, the solvent is removed by evaporation or other conventional means, providing an intimate dry admixture of stabilizer and polymer. Suitable inert, organic solvents which can be employed to effectively distribute the stabilizer throughout the polymer include the saturated aliphatic hydrocarbons, ethers, ketones, and esters, and the like. Examples of such solvents are dibutyl ether, diethyl ether, acetone, methyl ethyl ketone, hexane, heptane, cyclohexane, cycloheptane, methylcyclohexane, ethyl acetate, and the like.

As previously indicated, the instant invention contemplates the use of a stabilizing amount of one of the aforementioned stabilizers whereby the polymer is stabilized against substantial molecular weight degradation. By the term "stabilizing amount" as herein used, is meant that quantity of stabilizer which when added to the system containing olefin oxide polymer, in particular poly(ethylene oxide), is sufficient to effectively stabilize the polymer against substantial molecular weight degradation. The term also expresses the amount of stabilizer necessary to reduce the loss of viscosity of the polymer being stabilized, during storage, in transit, and the like, as compared with the corresponding polymer not containing therein the stabilizers of this invention. The art is well apprised of the technique of stabilizing organic compounds, and in general, the amount of stabilizer employed will be governed, to an extent, by the reduced viscosity of the olefin oxide polymer, by the particular stabilizer employed, the choice of the inert vehicle, and by other considerations.

In general, the concentration of stabilizer is not narrowly critical and can range from about 0.001 weight percent to about 10 weight percent, and higher, based on the total weight of solid polymer. A stabilizer concentration of from about 0.01 to about 5 weight percent is effective while a stabilizer concentration of from about 0.05 to about 2.0 weight percent is preferred. However, the optimum concentration of stabilizer depends, to a great extent, upon other variable as previously illustrated.

The following examples are illustrative:

EXAMPLES I–V

Granular poly(ethylene oxide) prepared by solution polymerization using a calcium amide catalyst was employed in these examples. The initial aqueous bulk viscosity of 1.0 weight percent polymer in aqueous solution was about 940 centipoises as determined by the model RVF Brookfield viscometer using the No. 2 spindle operating at 6 r.p.m. The bulk viscosities of these solutions were determined in a similar manner before and after aging for the indicated time.

One gram of the above described polymer was dissolved in 100 milliliters of methylene chloride containing the indicated amount of stabilizer. The bottles containing the solutions were exposed for 50 hours to the radiation of a standard 275 watt sun lamp at a distance of about two feet. The initial and final viscosities were determined by the method previously indicated. The pertinent data and results are shown in Table IV.

TABLE IV

| No. | Stabilizer | Amount of Stabilizer in grams | Initial Viscosity [a] | Final Viscosity [a] | Percent Viscosity Loss |
|---|---|---|---|---|---|
| 1 | Control | 0 | 2,160 | 190 | 91 |
| 2 | 1,1-diphenyl-2-picrylhydrazine | 0.05 | 2,290 | 2,350 | −2.6 |
| 3 | ___do___ | 0.02 | 1,770 | 1,590 | 10.2 |
| 4 | ___do___ | 0.01 | 2,030 | 1,820 | 10.3 |
| 5 | 1,1-diphenyl-2-picrylhydrazyl | 0.05 | 2,060 | 2,020 | 1.9 |

[a] Bulk viscosity measured in centipoises.

What is claimed is:

1. A composition comprising an olefin oxide polymer selected from the group consisting of (1) poly(ethylene oxide) and (2) copolymers comprised of at least 50 weight percent of ethylene oxide in copolymerized form with up to 50 weight percent of lower olefin oxides of the group consisting of propylene oxide and butylene oxide, said polymer having a reduced viscosity value of at least 1.0 as measured at a concentration of 0.2 gram of said polymer in 100 milliliters of acetonitrile at 30° C., and a stabilizing amount of a compound which is selected from the group consisting of 1,1-diphenyl-2-picrylhydrazine and 1,1-diphenyl-2-picrylhydrazyl.

2. The composition of claim 1 wherein the olefin oxide polymer is solid poly(ethylene oxide).

3. The composition of claim 1 wherein the olefin oxide polymer is a solid copolymer comprised of at least 50 weight percent of ethylene oxide in copolymerized form with up to 50 weight percent of a lower olefin oxide which is selected from the group consisting of propylene oxide and butylene oxide.

4. A composition comprising solid poly(ethylene oxide) which has a reduced viscosity value of at least 1.0 as measured at a concentration of 0.2 gram of said poly(ethylene oxide) in 100 milliliters of acetonitrile at 30° C., and from about 0.001 to about 10 weight percent, based on the weight of said poly(ethylene oxide), of a compound which is selected from the group consisting of 1,1-diphenyl-2-picrylhydrazine and 1,1-diphenyl-2-picrylhydrazyl.

5. The composition of claim 4 wherein said composition is contained in an inert, normally liquid organic vehicle.

6. The composition of claim 4 wherein said composition is contained in an aqueous solution.

7. A composition comprising solid poly(ethylene oxide) which has a reduced viscosity value of at least 1.0 as measured at a concentration of 0.2 gram of said poly(ethylene oxide) in 100 milliliters of acetonitrile at 30° C., and from about 0.05 to about 2.0 weight percent, based on the weight of said poly(ethylene oxide), of a compound which is selected from the group consisting of 1,1-diphenyl-2-picrylhydrazine and 1,1-diphenyl-2-picrylhydrazyl.

References Cited in the file of this patent
UNITED STATES PATENTS

| | | |
|---|---|---|
| 2,018,645 | Williams et al. | Oct. 22, 1935 |
| 2,706,189 | Pruitt et al. | Apr. 12, 1955 |
| 2,810,708 | Kubico et al. | Oct. 22, 1957 |
| 2,897,178 | Hill | July 28, 1959 |